United States Patent
Ishihara et al.

(10) Patent No.: US 12,542,463 B2
(45) Date of Patent: Feb. 3, 2026

(54) BRIDGELESS ROTOR ASSEMBLY WITH REDUCED MAGNETIC FLUX LEAKAGE

(71) Applicant: BorgWarner Inc., Auburn Hills, MI (US)

(72) Inventors: Mitsuru Ishihara, Kanagawa (JP); Andreas WP Mayer, Clarkston, MI (US); Calahan B. Campton, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 291 days.

(21) Appl. No.: 17/957,065

(22) Filed: Sep. 30, 2022

(65) Prior Publication Data
US 2024/0113579 A1  Apr. 4, 2024

(51) Int. Cl.
*H02K 1/276* (2022.01)
*H02K 1/28* (2006.01)

(52) U.S. Cl.
CPC .............. *H02K 1/2766* (2013.01); *H02K 1/28* (2013.01)

(58) Field of Classification Search
CPC ........... H02K 1/2766; H02K 1/28; H02K 1/32
See application file for complete search history.

(56) References Cited

U.S. PATENT DOCUMENTS

| | | | |
|---|---|---|---|
| 6,047,461 A | 4/2000 | Miura et al. | |
| 8,728,375 B2 | 5/2014 | Matsubayashi et al. | |
| 2005/0140230 A1 | 6/2005 | Johnson et al. | |
| 2008/0179980 A1 | 7/2008 | Dawsey et al. | |
| 2012/0074807 A1 | 3/2012 | Burton et al. | |
| 2013/0026872 A1 | 1/2013 | Cirani et al. | |
| 2015/0130318 A1 | 5/2015 | Kitada et al. | |
| 2015/0303753 A1 | 10/2015 | Huang et al. | |
| 2018/0287439 A1 | 10/2018 | Degner et al. | |
| 2018/0358852 A1 | 12/2018 | Roopnarine | |

(Continued)

FOREIGN PATENT DOCUMENTS

| | | | |
|---|---|---|---|
| CN | 105099041 A | 11/2015 | |
| CN | 114938694 A | 8/2022 | |

(Continued)

OTHER PUBLICATIONS

WO2018171973A1 English translation (Year: 2024).*

(Continued)

*Primary Examiner* — Christopher M Koehler
*Assistant Examiner* — Viswanathan Subramanian
(74) *Attorney, Agent, or Firm* — Howard & Howard Attorneys PLLC

(57) ABSTRACT

A rotor assembly for an electric motor includes a shaft extending along and rotatable about an axis. The rotor assembly also includes a lamination stack coupled to the shaft, a plurality of magnets including a first magnet coupled to the lamination stack, and a plurality of pole pieces spaced radially outward from the shaft. Each pole piece of the plurality of pole pieces is separate from the lamination stack. The plurality of pole pieces includes a first pole piece, and the first and second magnets are disposed between the lamination stack and the first pole piece. The rotor assembly further includes a plurality of spacers including a first spacer disposed between the first pole piece and the lamination stack to reduce flux leakage of the first magnet.

19 Claims, 5 Drawing Sheets

(56) References Cited

U.S. PATENT DOCUMENTS

| | | | |
|---|---|---|---|
| 2019/0238016 A1 | 8/2019 | Paweletz | |
| 2020/0266677 A1 | 8/2020 | Tago et al. | |
| 2021/0075280 A1 | 3/2021 | Leonardi et al. | |
| 2022/0399768 A1 | 12/2022 | Aso et al. | |

FOREIGN PATENT DOCUMENTS

| | | | |
|---|---|---|---|
| CN | 115118045 A | | 9/2022 |
| DE | 102015203018 A1 | | 8/2016 |
| DE | 102016219120 A1 | | 4/2018 |
| DE | 102019127583 A1 | | 4/2021 |
| JP | 05292690 A | * | 11/1993 |
| JP | 2012147644 A | | 8/2012 |
| WO | WO-2018171973 A1 | * | 9/2018 |
| WO | 2021225902 A1 | | 11/2021 |

OTHER PUBLICATIONS

DE102016219120A1 English translation (Year: 2025).*
JP05292690A English translation (Year: 2025).*
U.S. Appl. No. 17/957,019, filed Sep. 30, 2022.
U.S. Appl. No. 17/957,110, filed Sep. 30, 2022.
International Search Report for Application No. PCT/US2023/030819 dated Nov. 29, 2023, 2012, 3 pages.
English language abstract for CN 105099041 A extracted from espacenet.com database on Dec. 10, 2023, 1 page.
English language abstract for CN 114938694 A extracted from espacenet.com database on Dec. 10, 2023, 2 pages.
Machine-assisted English language abstract and machine-assisted English language translation for DE 10 2016 219 120 A1 extracted from espacenet.com database on Dec. 10, 2023, 18 pages.
Machine-assisted English language abstract and machine-assisted English language translation for DE 10 2015 203 018 A1 extracted from espacenet.com database on Dec. 30, 2023, 17 pages.
Machine-assisted English language abstract and machine-assisted English language translation for DE 10 2019 127 583 A1 extracted from espacenet.com database on Dec. 30, 2023, 15 pages.
English language abstract and machine-assisted English language translation for JP 2012-147644 A extracted from espacenet.com database on Dec. 30, 2023, 16 pages.
International Search Report for Application No. PCT/US2023/030803 dated Dec. 8, 2023, 3 pages.
International Search Report for Application No. PCT/US2023/030812 dated Dec. 8, 2023, 3 pages.
English language abstract and machine-assisted English language translation for CN 115118045 A extracted from espacenet.com database on May 7, 2025, 13 pages.

* cited by examiner

BRIDGELESS ROTOR ASSEMBLY WITH REDUCED MAGNETIC FLUX LEAKAGE

BACKGROUND OF THE INVENTION

1. Field of the Invention

The invention generally relates to a rotor assembly for an electric motor and to an electric motor including the rotor assembly.

2. Description of the Related Art

Electric motors include a rotor assembly and a stator disposed about the rotor assembly. Rotor assemblies commonly include a shaft, a lamination stack disposed about the shaft, and a plurality of pole pieces spaced radially from the lamination stack. Typically, permanent magnets are embedded into the rotor assembly, commonly between the lamination stack and plurality of pole pieces, and generate magnetic flux. Stators include coil windings, and energization of the coil windings in the stator generates magnetic flux which interacts with the magnetic flux generated by the permanent magnets to impart a force which causes the rotor assembly to rotate.

Typically, the lamination stack and the plurality of pole pieces are physically connected to one another through a plurality of bridges, thus forming what is commonly referred to as a bridged rotor assembly. Each bridge is unitary with both the lamination stack and one of the plurality of pole pieces and is typically comprised of the same material as the lamination stack and the plurality of pole pieces. The bridge prevents the plurality of pole pieces from moving away from the lamination stack due to centrifugal forces imparted on the plurality of pole pieces during rotation of the rotor assembly.

However, the magnetic flux generated by the permanent magnets is disrupted, or leaked, by the bridge so that a portion of the magnetic flux is directed toward the lamination stack and connects the north and south pole of each permanent magnet. Leaked magnetic flux limits the amount of magnetic flux from the permanent magnets available to interact with the magnetic flux generated by the coil windings of the stator, thus lowering the force imparted to the rotor assembly and thus also lowing the efficiency of the electric motor. Leakage of magnetic flux will occur until the bridge reaches magnetic saturation. To minimize leakage of flux through the bridge, the bridge is typically designed to be as thin as possible to quickly reach magnetic saturation within the lamination stack and therefore reduce flux leakage of the permanent magnets. However, the centrifugal forces imparted to the plurality of pole pieces by rotation of the rotor assembly are also imparted to the bridge. These centrifugal forces imparted to the bridge result in a concentration of stress on the bridge and risk structural failure of the bridge, particularly when the bridge has been designed to be as thin as possible.

As such, there remains a need to provide an improved rotor assembly for an electric motor.

SUMMARY OF THE INVENTION AND ADVANTAGES

A rotor assembly for an electric motor is disclosed. The rotor assembly includes a shaft extending along and rotatable about an axis. The rotor assembly also includes a lamination stack coupled to the shaft, a plurality of magnets including a first magnet coupled to the lamination stack, and a plurality of pole pieces spaced radially outward from the shaft. Each pole piece of the plurality of pole pieces is separate from the lamination stack. The plurality of pole pieces includes a first pole piece, and the first magnet is disposed between the lamination stack and the first pole piece. The rotor assembly further includes a plurality of spacers including a first spacer disposed between the first pole piece and the lamination stack to reduce flux leakage of the first magnet.

The first spacer prevents disruption, or leakage, or magnetic flux of the first magnet. As such, the magnetic flux of the first magnet is ensured to be available to efficiently impart a force to the rotor assembly to rotate the rotor assembly. Each pole piece of the plurality of pole pieces is separate from the lamination stack, thus forming a bridgeless arrangement of the pole pieces and the lamination stack. As such, centrifugal forces imparted to the plurality of pole pieces by rotation of the rotor assembly are not also imparted to any bridge connecting the plurality of pole pieces and the lamination stack. Thus, the bridgeless arrangement of the pole pieces and the lamination stack removes concern for centrifugal forces imparting a force on any bridge, resulting in a concentration of stress on any bridge, and potentially resulting in structural failure of any bridge.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
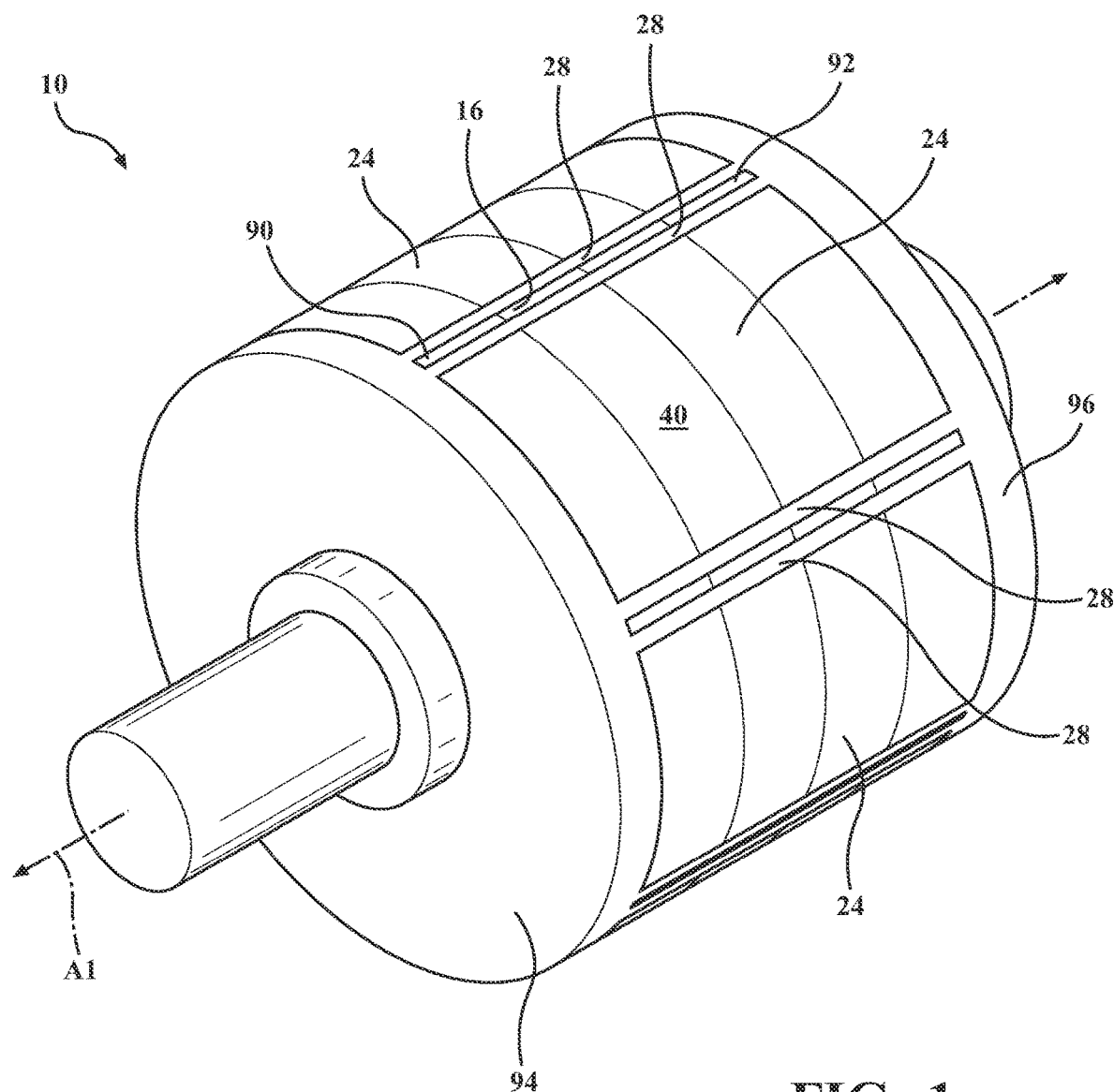
FIG. 1 is a perspective view of the rotor assembly according to the invention.

With reference to the Figures, wherein like numerals indicate like parts throughout the several views, a rotor assembly 10 for an electric motor 12 is shown throughout FIGS. 1-5. The rotor assembly 10 includes a shaft 14 extending along and rotatable about an axis A1. The rotor assembly 10 also includes a lamination stack 16 coupled to the shaft 14, a plurality of magnets 18 including a first magnet 20 coupled to the lamination stack 16, and a plurality of pole pieces 24 spaced radially outward from the shaft 14. Although not required, the plurality of magnets 18 may also include a second magnet 22 coupled to the lamination stack 16. Each pole piece of the plurality of pole pieces 24 is separate from the lamination stack 16. It is to be appreciated that the plurality of pole pieces 24 may be referred to as a plurality of pole shoes. The plurality of pole pieces 24 includes a first pole piece 26, and the first magnet 20 is disposed between the lamination stack 16 and the first pole piece 26. In the embodiments with the second magnet 22, the second magnet 22 is disposed between the lamination stack 16 and the first pole piece 26. The rotor assembly 10 further includes a plurality of spacers 28 including a first spacer 30 disposed between the first pole piece 26 and the lamination stack 16 to reduce flux leakage of the first magnet 20.

The first spacer 30 prevents disruption, or leakage, of magnetic flux of the first magnet 20. As such, the magnetic flux of the first magnet 20 is ensured to be available to efficiently impart a force to the rotor assembly 10 to rotate the rotor assembly 10. Each pole piece of the plurality of pole pieces 24 is separate from the lamination stack 16. In other words, each pole piece 24 of the plurality of pole pieces 24 is a separate component from the lamination stack 16. Thus, a bridgeless arrangement of the pole pieces 24 and the lamination stack 16 is formed. In other words, in the bridgeless arrangement, the pole pieces 24 and the lamination stack 16 are not connected to one another through a bridging material. As such, centrifugal forces imparted to the plurality of pole pieces 24 by rotation of the rotor assembly 10 are not also imparted to any bridge connecting the plurality of pole pieces 24 and the lamination stack 16. Thus, the bridgeless arrangement of the pole pieces 24 and the lamination stack 16 removes concern for centrifugal forces imparting a force on any bridge, resulting in a concentration of stress on any bridge, and potentially resulting in structural failure of any bridge.

Although the benefits of the first spacer 30 have been described with reference to the first pole piece 26, the first magnet 20, optionally the second magnet 22, and the lamination stack 16, it is to be appreciated that these benefits may apply equally to all other spacers 28 of the plurality of spacers 28, all other pole pieces 24 of the plurality of pole pieces 24, all other magnets 18 of the plurality of magnets 18, and the lamination stack 16. Each spacer 28 and pole piece 24 may have the characteristics of the first spacer 30 and the first pole piece 26 as described herein. More specifically, the plurality of spacers 28 may prevent disruption, or leakage, of magnetic flux between the plurality of pole pieces 24 and the lamination stack 16. As such, the magnetic flux is ensured to be available to efficiently impart a force to the rotor assembly 10 to rotate the rotor assembly 10.

The lamination stack 16 may be manufactured from a plurality of laminations which are fixed to one another, in non-limiting examples by interlocking, welding, clamping, and/or bonding. To improve manufacturability of the lamination stack 16, each lamination of the lamination stack 16 may be the same as every other lamination in the lamination stack 16.

Figure 2A:
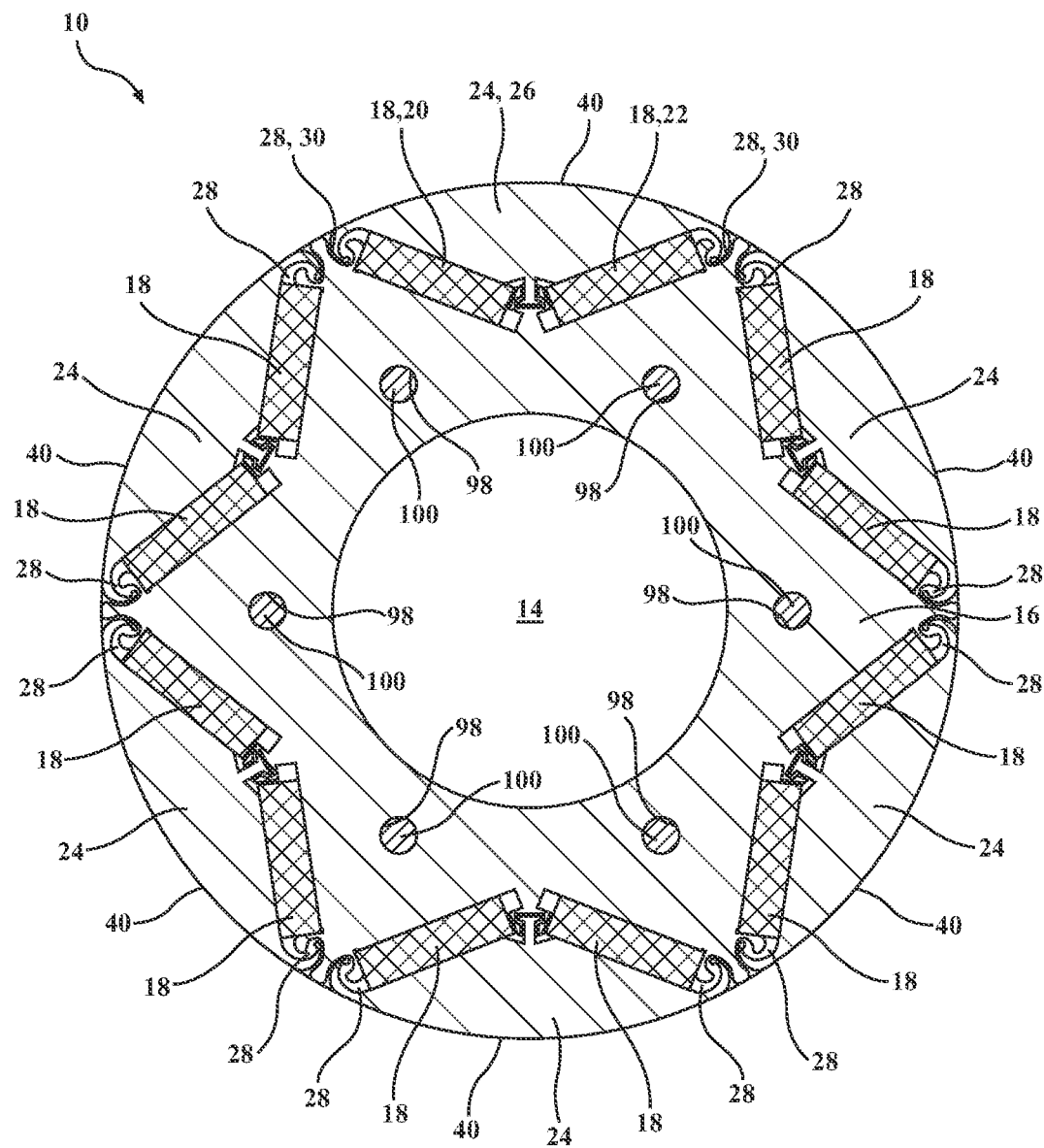
FIG. 2A is a cross-sectional view of one embodiment of the rotor assembly, with the rotor assembly including a lamination stack, a plurality of pole pieces, a plurality of magnets, and a plurality of spacers.

Each magnet of the plurality of magnets 18, including the first magnet 20 and the second magnet 22, may be a permanent magnet. The first magnet 20 and the second magnet 22 may be configured to form a V-shape, as shown in FIGS. 2A-3. Each pole piece of the plurality of pole pieces 24, including the first pole piece 26, may be comprised of metals and/or metalloids including, but not limited to, iron, cobalt, nickel, silicon, manganese, aluminum, steel including electrical steel, and combinations thereof. The lamination stack 16 may be comprised of metals and/or metalloids including, but not limited to, iron, cobalt, nickel, silicon, manganese, aluminum, steel including electrical steel, and combinations thereof. Although not required, it is to be appreciated that the plurality of pole pieces 24 may be comprised of the same metal and/or metalloids that the lamination stack 16 is comprised of.

The first spacer 30 may comprise a polymeric material. In non-limiting examples, the polymeric material of the first spacer 30 may be a thermoplastic, a thermoset, or an elastomer. The polymeric material of the first spacer 30 may be an engineering plastic. More specifically, the polymeric material of the first spacer 30 may be any polyalkene or polyolefin including copolymers and terpolymers thereof such as polyethylene including high-density polyethylene (HDPE) and low-density polyethylene (LDPE), polypropylene (PP), polybutylene and polybutylene terephthalate (PBTR), acrylics such as acrylonitrile butadiene styrene (ABS) or polymethylmethacrylate (PMMA), polyoxymethylene (POM) or any acetal copolymers or acetal terpolymers, polyketones, polyetherketones, and/or polyaryletherketones such as polyetheretherketone (PEEK) and polyetherketoneketone (PEKK), polyetherimide (PEI), polyimides, polyvinylchloride (PVC), polyphenylene sulfide (PPS), polyphenylene oxide (PPO), polysulphone (PSU), polytetrafluoroethylene (PTFE), polyamides including polyphthalamide, polycarbonates, urethanes, epoxies, and thermoplastic elastomers (TPE). Although not required, the polymeric material of the first spacer 30 may be molded, such as over-molded, insert molded, injection molded, compression molded, and thermoformed.

The first spacer 30 may also comprise a first composition including any of the polymeric materials detailed herein as well as optional fillers and/or additives, such as plasticizers, carbon including carbon fiber, ceramic materials and/or minerals including calcium carbonate, silica, clay, and kaolin, fibers including glass fibers, carbon fibers, aramid fibers, basalt fibers, and paper fibers, stabilizers including oxidation stabilizers, ultraviolet (UV) stabilizers, heat stabilizers, light absorbers, strengtheners, acid scavengers, metal deactivators, and flame retardants including, for example, aluminum hydroxide, phosphorus compounds, and brominated compounds.

The first spacer 30 may extend at least to the first magnet 20 and may extend at least to the second magnet 22. The first spacer 30 may also be disposed between the first magnet 20 and the second magnet 22. It is to be appreciated that the first spacer 30 may extend radially inward toward the first magnet 20 and may also extend past the first magnet 20, optionally encapsulating at least a portion of the first magnet 20, to then be disposed between the first magnet 20 and the second magnet 22. Similarly, it is to be appreciated that the first spacer 30 may extend radially inward toward the second magnet 22 and may also extend past the second magnet 22, optionally encapsulating at least a portion of the second magnet 22, to then be disposed between the first magnet 20 and the second magnet 22.

As shown in FIGS. 2 and 3, the lamination stack 16 may have a lamination retainer 32 and the first pole piece 26 may have a pole retainer 34 configured to mechanically cooperate with the lamination retainer 32 of the lamination stack 16 to retain the first pole piece 26 with respect to the lamination stack 16. Mechanical cooperation of the lamination retainer 32 of the lamination stack 16 and the pole retainer 34 of the first pole piece 26 limits movement of the first pole piece 26 with respect to the lamination stack 16. More specifically, mechanical cooperation of the lamination retainer 32 of the lamination stack 16 and the pole retainer 34 of the first pole piece 26 limits radial movement of the first pole piece 26 with respect to the lamination stack 16.

Moreover, mechanical cooperation between the pole retainer 34 and the lamination retainer 32 need not require direct contact between the pole retainer 34 and the lamination retainer 32. The pole retainer 34 and the lamination retainer 32 may not be in contact with one another. In a non-limiting example, there may an intervening component disposed between the pole retainer 34 and the lamination retainer 32 while still permitting the pole retainer 34 to mechanically cooperate with the lamination retainer 32 to retain the first pole piece 26 with respect to the lamination stack 16. More specifically, the first spacer 30 may be disposed between the lamination retainer 32 of the lamination stack 16 and the pole retainer 34 of the first pole piece 26. Disposing the first spacer 30 between the lamination retainer 32 and the pole retainer 34 increases the strength of the mechanical cooperation between the pole retainer 34 and the lamination retainer 32 by reducing or eliminating any gaps or voids between the pole retainer 34 and the lamination retainer 32.

The lamination retainer 32 has a lamination retainer end 36, and the pole retainer 34 has a pole retainer end 38. The pole retainer end 38 may be disposed radially inward relative to the lamination retainer end 36. The lamination retainer end 36 may be the terminus of the lamination retainer 32, and the pole retainer end 38 may be the terminus of the pole retainer 34. Disposing the pole retainer end 38 radially inward relative to the lamination retainer end 36 restricts the movement of the first pole piece 26 relative to the lamination stack 16. More specifically, if the first pole piece 26 were to be moved radially away from the lamination stack 16, the pole retainer end 38 may contact either the lamination retainer end 36 directly or may contact an intervening component, such as the first spacer 30, which contacts the lamination retainer end 36. In so doing, the pole retainer end 38 and the lamination retainer end 36 prevents the first pole piece 26 from moving radially away from the lamination stack 16.

The first pole piece 26 has a first circumferential end 42 and a second circumferential end 44 spaced circumferentially from the first circumferential end 42. The first pole piece 26 also has an outer pole surface 40 facing away from the axis A1 and extending between the first and second circumferential ends 42, 44. In some embodiments, the first spacer 30 is disposed circumferentially between the first circumferential end 42 and the lamination stack 16. Is to be appreciated that the first spacer 30 may alternatively be disposed circumferentially between the second circumferential end 44 and the lamination stack 16, or the first spacer 30 may disposed circumferentially both between the first circumferential end 42 and the lamination stack 16 as well as between the second circumferential end 44 and the lamination stack 16. Moreover, although not required, the first spacer 30 may be integrated into a sleeve having an outer sleeve body extending about the outer pole surfaces of each of the plurality of pole pieces 24, and the first spacer 30 may extend radially inward from the outer sleeve body of the sleeve.

In some embodiments, the lamination retainer 32 and the pole retainer 34 are disposed between the first magnet 20 and the second magnet 22. In the embodiments where the lamination retainer 32 and the pole retainer 34 are disposed between the first magnet 20 and the second magnet 22, the mechanical cooperation retaining the first pole piece 26 to the lamination stack 16 occurs approximately equidistantly between the first circumferential end 42 of the first pole piece 26 and the second circumferential end 44 of the first pole piece 26. As such, the mechanical cooperation retaining the first pole piece 26 to the lamination stack 16 occurs at the approximate circumferential center of mass of the first pole piece 26, thus preventing either of the first circumferential end 42 of the first pole piece 26 and the second circumferential end 44 of the first pole piece 26 from moving further away from the lamination stack 16 as compared to the other of the first and second circumferential ends 42, 44.

In other embodiments, the pole retainer 34 is disposed at the first circumferential end 42 of the first pole piece 26. It is to be appreciated that pole retainer 34 may also be disposed at the second circumferential end 44 of the first pole piece 26. The pole retainer 34 may also be further defined as a first pole retainer 46, the lamination retainer 32 may also be further defined as a first lamination retainer 48, and the lamination stack 16 may further have a second lamination retainer 50 and the first pole piece 26 may further have a second pole retainer 52. The second pole retainer 52 of the first pole piece 26 may be disposed at the second circumferential end 44 of the first pole piece 26, and the second pole retainer 52 may be configured to mechanically cooperate with the second lamination retainer 50 of the lamination stack 16 to retain the first pole piece 26 with respect to the lamination stack 16.

In the embodiments where the first pole retainer 46 is disposed at the first circumferential end 42 of the first pole piece 26 and the second pole retainer 52 is disposed at the second circumferential end 44 of the first pole piece 26, the mechanical cooperation retaining the first pole piece 26 to the lamination stack 16 occurs both at the first circumferential end 42 of the first pole piece 26 and at the second circumferential end 44 of the first pole piece 26. Two separate and circumferentially spaced locations of mechanical cooperation strengthen the retention of the first pole piece 26 to the lamination stack 16. More specifically, two separate and circumferentially spaced locations of mechanical cooperation limits the relative amount of pivoting of the first pole piece 26 relative to the lamination stack 16.

In one embodiment, one of the lamination retainer 32 and the pole retainer 34 has a generally C-shaped configuration 54 defining a channel 56, and the other of the lamination retainer 32 and the pole retainer 34 has a generally T-shaped configuration 58 disposed at least partially in the channel 56. In other words, as shown in FIGS. 2A and 2B, the lamination retainer 32 may have the generally C-shaped configuration 54 and the pole retainer 34 may have the generally T-shaped configuration 58, or the lamination retainer 32 may have the generally T-shaped configuration 58 and the pole retainer 34 may have the generally C-shaped configuration 54.

Figure 2B:
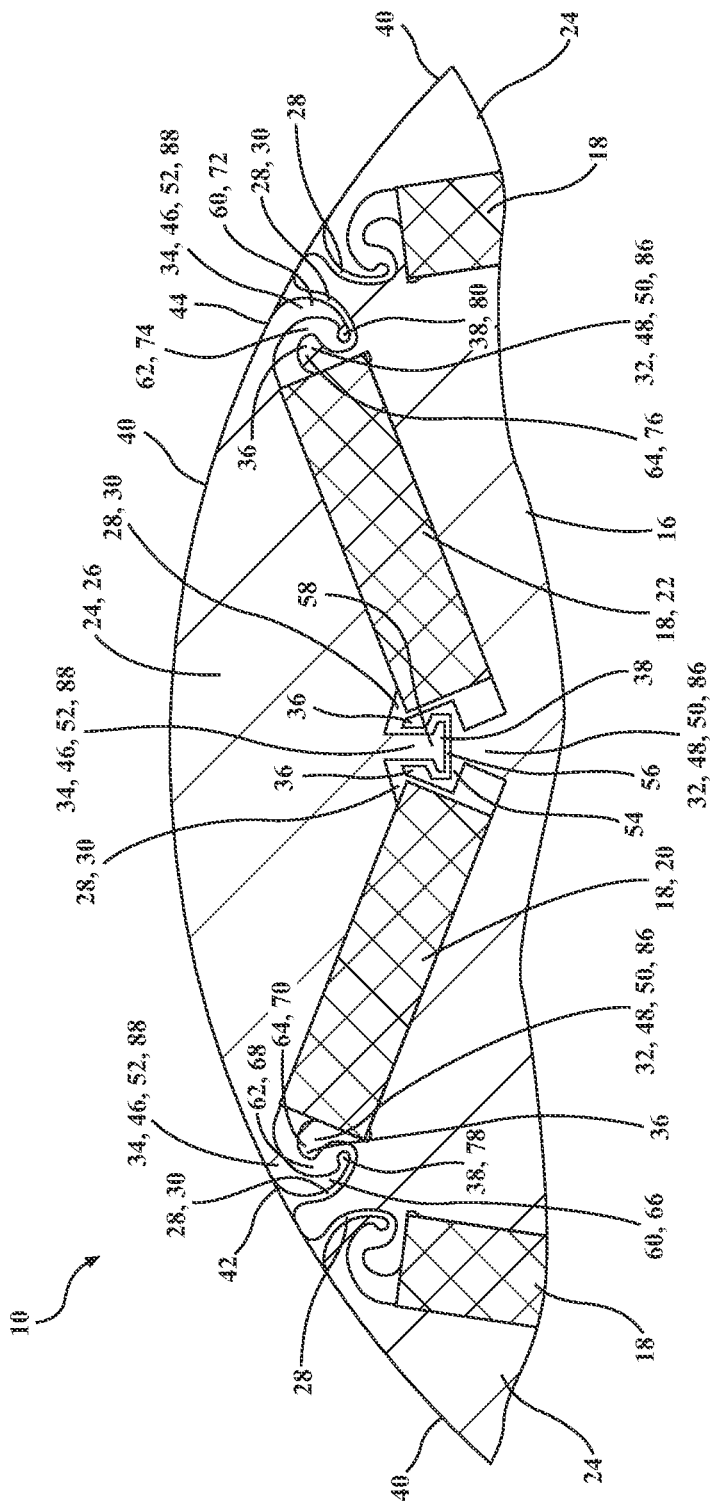
FIG. 2B is an expanded view of FIG. 2A.
Figure 3:
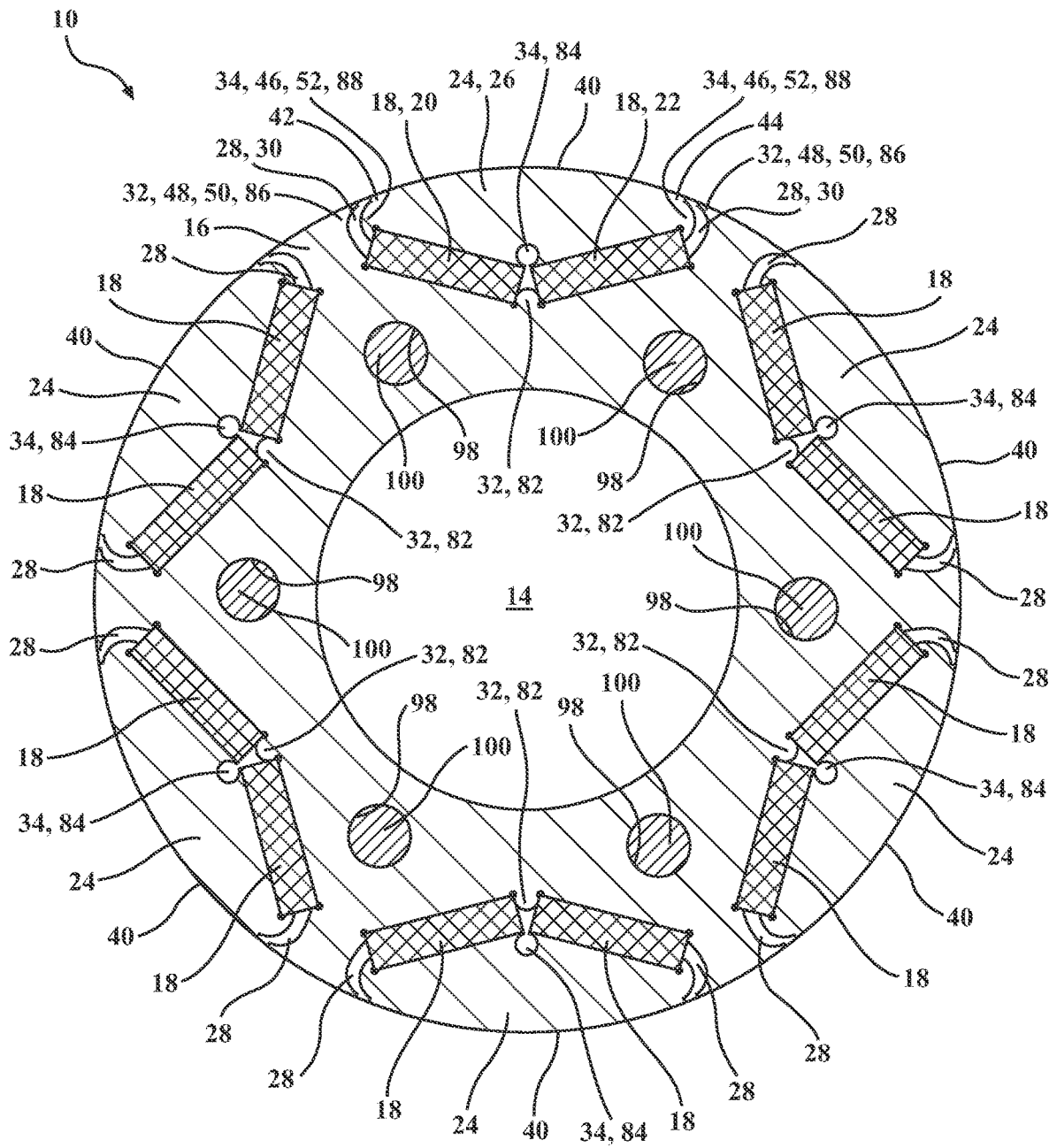
FIG. 3 is a cross-sectional view of another embodiment of the rotor assembly.

In another embodiment, as shown in FIGS. 2A and 2B, the pole retainer 34 includes a pole hook 60 defining a hook recess 62, and the lamination retainer 32 includes a lamination hook 64 extending at least partially into the hook recess 62 defined by the pole hook 60 to retain the first pole piece 26 to the lamination stack 16. In the embodiments where the rotor assembly 10 includes first and second pole retainers 46, 52 and first and second lamination retainers 48, 50, the first pole retainer 46 may include a first pole hook 66 defining a first hook recess 68 and the first lamination retainer 48 may include a first lamination hook 70. In these embodiments, the second pole retainer 52 may include a second pole hook 72 defining a second hook recess 74, and the second lamination retainer 50 may include a second lamination hook 76 extending at least partially into the second hook recess 74 defined by the second pole hook 72 to retain the first pole piece 26 to the lamination stack 16. The first pole hook 66 may have a first hook end 78 and the second pole hook 72 may have a second hook end 80, and the first hook end 78 of the first pole hook 66 and the second hook end 80 of the second pole hook 72 may extend toward one another to increase the strength of the retention of the first pole piece 26 to the lamination stack 16. It is to be appreciated that the first hook end 78 may be the terminus of the first pole hook 66 and the second hook end 80 may be the terminus of the second pole hook 72.

As shown in FIG. 3, at least one of the lamination retainer 32 and the pole retainer 34 may have a generally mushroom-shaped configuration 82, and the other of the lamination retainer 32 and the pole retainer 34 may form a complimentary retainer recess 84. In other words, as shown in FIG. 3, the lamination retainer 32 may have the generally mushroom-shaped configuration 82 and the pole retainer 34 may form the retainer recess 84. Alternatively, the lamination retainer 32 may form the retainer recess 84 and the pole retainer 34 may have the generally mushroom-shaped configuration 82. The generally mushroom-shaped configuration 82 of either the lamination retainer 32 or the pole retainer 34 may contact the first magnet 20 and the second magnet 22, either directly or through an intervening component such as the first spacer 30, to assist in retaining the first and second magnets 20, 22. Moreover, the first spacer 30 may be disposed in the retainer recess 84 to further retain the first pole piece 26 relative to the lamination stack 16.

It is to be appreciated that the rotor assembly 10 may further include a third lamination retainer 86 and a third pole retainer 88. The third lamination retainer 86 may have any of the characteristics of any of the lamination retainers as described herein, and the third pole retainer 88 may have any of the characteristics of any of the pole retainers as described herein.

The lamination stack 16 extends along the axis A1 between a first lamination stack end 90 and a second lamination stack end 92. The rotor assembly 10 may further include a first end cap 94 adjacent to the first lamination stack end 90 and a second end cap 96 adjacent to the second lamination stack end 92. The first end cap 94 and the second end cap 96 assist in preventing the plurality of magnets 18 from being dispelled from between the plurality of pole pieces 24 and the lamination stack 16. The first end cap 94 and the second end cap 96 may be unitary with the first spacer 30. In other words, the first end cap 94, the second end cap 96, and the first spacer 30 may be integral with one another, i.e., one-piece.

The lamination stack 16 typically defines a plurality of channels 98 between the first lamination stack end 90 and the second lamination stack end 92. The plurality of channels 98 may be configured to direct lubricant throughout the rotor assembly 10 for lubrication and/or cooling of the rotor assembly 10. The rotor assembly 10 may further include a plurality of rods 100 disposed in the plurality of channels 98, as shown in FIGS. 2 and 3. It is to be appreciated that the plurality of rods 100 may be disposed in the plurality of channels 98 and the lamination stack 16 may still define channels 98 which are configured to direct lubricant throughout the rotor assembly 10 for lubrication and/or cooling of the rotor assembly 10. Alternatively, it is also to be appreciated that one rod of the plurality of rods 100 may correspond to, and be disposed in, one channel of the plurality of channels 98. The plurality of rods 100 may be unitary with the first end cap 94 and the second end cap 96. In other words, the plurality of rods 100, the first end cap 94, and the second end cap 96 may be integral with one another, i.e., one-piece. The plurality of rods 100, the first end cap 94, and the second end cap 96 may be formed integrally with one another.

The first end cap 94, the second end cap 96, and/or the plurality of rods 100 may comprise a polymeric material. In the embodiments where the first spacer 30 comprises a polymeric material and the first end cap 94, the second end cap 96, and/or the plurality of rods comprise a polymeric material, it is to be appreciated that these polymeric materials may be the same as each other or may be different from one another. In non-limiting examples, the polymeric material of the first end cap 94, the second end cap 96, and/or the plurality of rods 100 may be a thermoplastic, a thermoset, or an elastomer. The polymeric material of the first end cap 94, the second end cap 96, and/or the plurality of rods 100 may be an engineering plastic.

More specifically, the polymeric material of the first end cap 94, the second end cap 96, and/or the plurality of rods 100 may be any polyalkene or polyolefin including copolymers and terpolymers thereof such as polyethylene including high-density polyethylene (HDPE) and low-density polyethylene (LDPE), polypropylene (PP), polybutylene and polybutylene terephthalate (PBTR), acrylics such as acrylonitrile butadiene styrene (ABS) or polymethylmethacrylate (PMMA), polyoxymethylene (POM) or any acetal copolymers or acetal terpolymers, polyketones, polyetherketones, and/or polyaryletherketones such as polyetheretherketone (PEEK) and polyetherketoneketone (PEKK), polyetherimide (PEI), polyimides, polyvinylchloride (PVC), polyphenylene sulfide (PPS), polyphenylene oxide (PPO), polysulphone (PSU), polytetrafluoroethylene (PTFE), polyamides including polyphthalamide, polycarbonates, urethanes, epoxies, and thermoplastic elastomers (TPE). Although not required, the polymeric material of the first end cap 94, the second end cap 96, and/or the plurality of rods 100 may be molded, such as over-molded, insert molded, injection molded, compression molded, and thermoformed.

More specifically, the plurality of rods 100 may be non-magnetic, may be conductive to electricity, and may further include carbon fiber. It is to be appreciated that the first end cap 94 and/or the second end cap 96 may also be non-magnetic, may be conductive to electricity, and may further include carbon fiber. At least one of the first end cap 94 and the second end cap 96 may comprise a second composition. The second composition of the first end cap 94 and/or the second end cap 96 may be the same as, or different from the first composition of the first spacer 30. It is also to be appreciated that the plurality of rods may comprise the second composition such that at least one of the first end cap 94, the second end cap 96, and the plurality of rods 100 may comprise the second composition.

The second composition of the first end cap 94, the second end cap 96, and/or the plurality of rods 100 may include any of the polymeric materials detailed herein as well as optional fillers and/or additives, such as plasticizers, carbon including carbon fiber, ceramic materials and/or minerals including calcium carbonate, silica, clay, and kaolin, fibers including glass fibers, carbon fibers, aramid fibers, basalt fibers, and paper fibers, stabilizers including oxidation stabilizers, ultraviolet (UV) stabilizers, heat stabilizers, light absorbers, strengtheners, acid scavengers, metal deactivators, and flame retardants including aluminum hydroxide, phosphorus compounds, and brominated compounds. In one embodiment, the second composition includes a thermoplastic and a filler encapsulated by the thermoplastic. In this embodiment, the filler may include carbon fiber.

As detailed herein, the first spacer 30 may be molded, such as over-molded, insert molded, injection molded, compression molded, and thermoformed. It is to be appreciated that the first end cap 94, the second end cap 96, and/or the plurality of rods 100 may also be molded such as over-molded, insert molded, injection molded, compression molded, and thermoformed. More specifically, the polymeric material of the first end cap 94, the second end cap 96, and/or the plurality of rods 100 may be molded. It is to be appreciated that the first end cap 94, the second end cap 96, and the plurality of rods 100 may be molded together. The first spacer 30, the first end cap 94, the second end cap 96, and/or the plurality or rods 100 may be molded together.

The plurality of pole pieces 24 may include two pole pieces, three pole pieces, four pole pieces, five pole pieces, six pole pieces, seven pole pieces, eight pole pieces, nine pole pieces, ten pole pieces, or more than ten pole pieces. The plurality of magnets 18 may include two magnets, three magnets, four magnets, five magnets, six magnets, seven magnets, eight magnets, nine magnets, ten magnets, eleven magnets, twelve magnets, thirteen magnets, fourteen magnets, fifteen magnets, sixteen magnets, seventeen magnets, eighteen magnets, nineteen magnets, twenty magnets, or more than twenty magnets. Associated with each pole piece 24, the plurality of magnets 18 may be single magnet, or may be multiple barrier pole magnet arrays including but not limited to V-shaped arrays, double V-shaped arrays, U-shaped arrays, and delta shaped arrays. The plurality of channels 98 and the plurality of rods 100 may include two channels and two rods, three channels and three rods, four channels and four rods, five channels and five rods, six channels and six rods, seven channels and seven rods, eight channels and eight rods, nine channels and nine rods, ten channels and ten rods, eleven channels and eleven rods, twelve channels and twelve rods, thirteen channels and thirteen rods, fourteen channels and fourteen rods, fifteen channels and fifteen rods, sixteen channels and sixteen rods, seventeen channels and seventeen rods, eighteen channels and eighteen rods, nineteen channels and nineteen rods, twenty channels and twenty rods, or more than twenty channels and more than twenty rods. Each pole piece 24 may define one channel, may define two channels, may define three channels, or may define more than three channels. The lamination stack 16 may also define the plurality of channels 98, and may define one channel, two channels, three channels, four channels, five channels, six channels, seven channels, eight channels, nine channels, ten channels, or more than ten channels.

The rotor assembly 10 may be configured to rotate at rotational speeds above 20,000 rotations per minute (RPM). In non-limiting examples, the rotor assembly 10 may be configured to rotate between about 20,000 RPM and about 50,000 RPM, between about 20,000 RPM and about 40,000 RPM, between about 20,000 RPM and about 30,000 RPM, and between about 20,000 RPM and about 25,000 RPM. The lamination retainer 32 and the pole retainer 34 are capable of retaining the plurality of pole pieces 24 to the lamination stack 16 at rotational speeds at, or in excess of, 20,000 RPM. As such, the rotor assembly 10 may be considered a high-speed rotor assembly.

Figure 4:
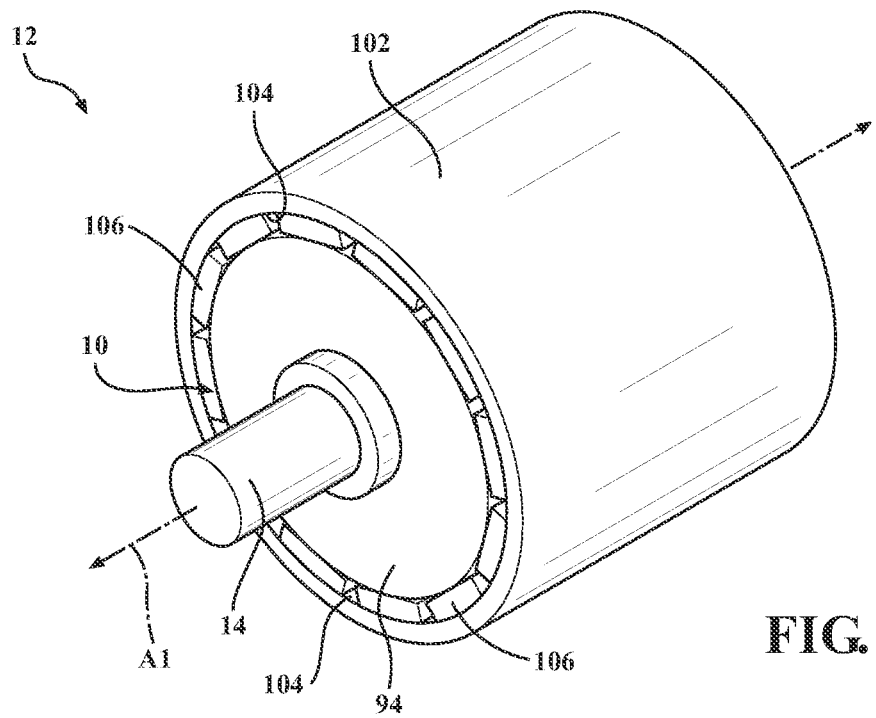
FIG. 4 is a perspective view of an electric motor including the rotor assembly.

The rotor assembly 10 may be incorporated into an electric motor 12, as shown in FIG. 4. The electric motor 12 includes a stator 102 extending along the axis A1 and defining a stator interior 104, and the rotor assembly 10 is disposed in the stator interior 104 of the stator 102. The rotor assembly 10 may be disposed completely within the stator interior 104 of the stator 102, or the rotor assembly 10 may be disposed only partially within the stator interior 104 of the stator 102. The stator 102 may include coil windings 106 that may be energized to generate the magnetic flux detailed herein. The plurality of spacers 28 increase the efficiency of the electric motor 12 by reducing the amount of the magnetic flux that is leaked, thus increasing the efficiency of force imparted to rotate the rotor assembly 10 relative to the amount of magnetic flux required to be generated.

Moreover, a gap may be defined between the outer pole surface 40 and the stator interior 104 of the stator 102. It is advantageous to reduce this gap to the extent possible to minimize losses due to air friction and also to increase torque on the rotor assembly 10. It is to be appreciated that the plurality of spacers 28 may be manufactured with relatively tight tolerances, thus permitting a relatively small gap to be defined between the outer pole surface 40 and the stator interior 104 of the stator 102, and thus also minimizing losses due to air friction. The gap may be as small as 0.2 millimeters and may scale with the tolerances of the diameter of the rotor assembly 10 and/or scale with the rotational speed of the rotor assembly 10. The gap may also scale on the order of about 0.1% of the diameter of the stator 102.

Figure 5:
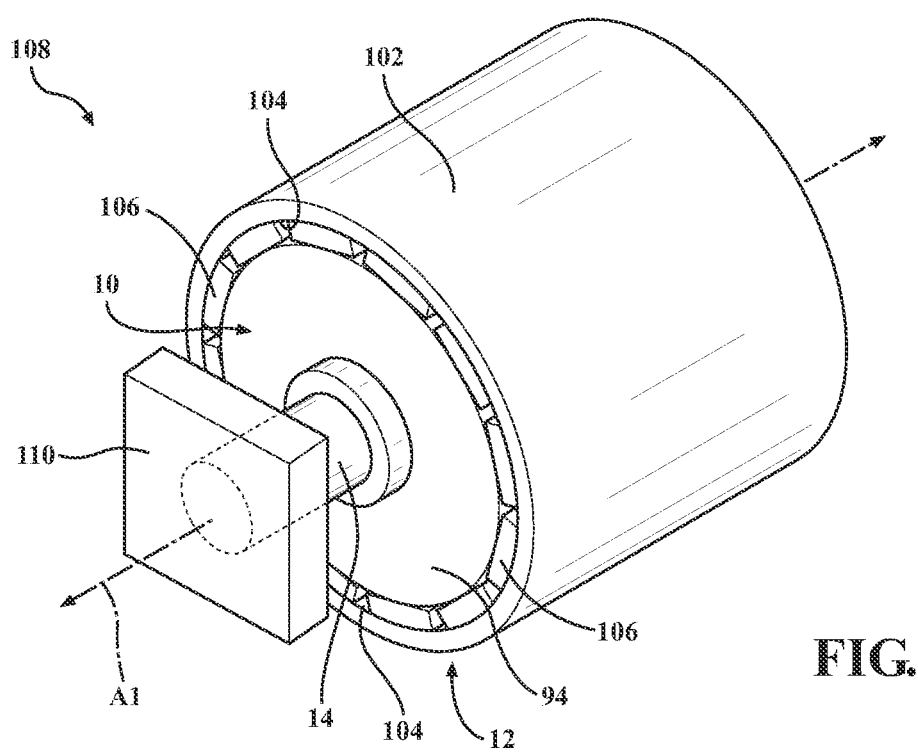
FIG. 5 is a perspective view partially in phantom of an electric drive unit including the electric motor of FIG. 4.

The electric motor 12 may be incorporated into an electric drive unit 108, as shown in FIG. 5. The electric drive unit 108 includes the electric motor 12 and a gear reduction mechanism 110 coupled to the shaft 14 of the rotor assembly 10. The gear reduction mechanism 110 may be configured to modulate torque received from the shaft 14. The gear reduction mechanism 110 may be a planetary gearset, a reduction gearbox such as a two-stage reduction gearbox, a worm gear reducer, a helical gear reducer, a spur gear reducer, a hypoid gear reducer, a bevel gear reducer, a gear train gear reducer, a cycloidal gear reducer, a magnetic gear reducer, an orthogonal gear reducer, a skew axes gear reducer, a parallel shaft gear reducer, a coaxial gear reducer, and combinations thereof.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A rotor assembly for an electric motor, said rotor assembly comprising:
a shaft extending along and rotatable about an axis;
a lamination stack coupled to said shaft;
a plurality of magnets comprising a first magnet coupled to said lamination stack;
a plurality of pole pieces wherein each pole piece of said plurality of pole pieces is spaced radially outward from said shaft and separate from said lamination stack, wherein said plurality of pole pieces comprises a first pole piece, and wherein said first magnet is disposed between said lamination stack and said first pole piece; and
a plurality of spacers comprising a first spacer disposed between said first pole piece and said lamination stack to reduce flux leakage of the first magnet,
wherein said lamination stack has a lamination retainer having a lamination retainer end and said first pole piece has a pole retainer having a pole retainer end disposed between said lamination retainer end and said lamination stack such that said lamination retainer and said pole retainer mechanically cooperate to retain said first pole piece with respect to said lamination stack,
wherein said pole retainer is further defined as a first pole retainer including a first pole hook defining a first hook recess, and said lamination retainer is further defined as a first lamination retainer including a first lamination hook extending at least partially into said first hook recess defined by said first pole hook to retain said first pole piece to said lamination stack,
wherein said first pole piece further includes a second pole retainer including a second pole hook defining a second hook recess, and said lamination stack further includes a second lamination retainer including a second lamination hook extending at least partially into said second hook recess defined by said second pole hook to retain said first pole piece to said lamination stack, and
wherein said first pole hook has a first hook end and said second pole hook has a second hook end, and wherein said first hook end and said second hook end extend toward one another.

2. The rotor assembly as set forth in claim 1, wherein said first spacer comprises a polymeric material.

3. The rotor assembly as set forth in claim 2, wherein said polymeric material is molded.

4. The rotor assembly as set forth in claim 1, wherein said first and second pole retainers are not in contact with said lamination retainer.

5. The rotor assembly as set forth in claim 1, wherein said first spacer is disposed between said lamination retainer and said first and second pole retainers.

6. The rotor assembly as set forth in claim 1, wherein said pole retainer end is disposed radially inward relative to said lamination retainer end.

7. The rotor assembly as set forth in claim 1, wherein said plurality of magnets further comprise a second magnet disposed between said first pole piece and said lamination stack, and wherein said first spacer is disposed between said first magnet and said second magnet.

8. The rotor assembly as set forth in claim 1, wherein said plurality of magnets further comprise a second magnet disposed between said first pole piece and said lamination stack, and wherein at least one of said lamination retainer and said first and second pole retainers is disposed between said first magnet and said second magnet.

9. The rotor assembly as set forth in claim 1, wherein said first pole piece has a first circumferential end and a second circumferential end spaced circumferentially from said first circumferential end, and has an outer pole surface facing away from said axis and extending between said first and second circumferential ends, and wherein said first spacer is disposed circumferentially between said first circumferential end and said lamination stack.

10. The rotor assembly as set forth in claim 9, wherein said first pole retainer is disposed at said first circumferential end of said first pole piece and said second pole retainer disposed at said second circumferential end of said first pole piece.

11. The rotor assembly as set forth in claim 1, wherein said lamination stack extends along said axis between a first lamination stack end and a second lamination stack end, wherein the rotor assembly further comprises a first end cap adjacent to said first lamination stack end and a second end cap adjacent to said second lamination stack end, and wherein said first end cap and said second end cap are unitary with said first spacer.

12. The rotor assembly as set forth in claim 11, wherein said lamination stack defines a plurality of channels between said first lamination stack end and said second lamination stack end, wherein the rotor assembly further comprises a plurality of rods disposed in said plurality of channels, and wherein said plurality of rods are unitary with said first end cap and said second end cap.

13. An electric motor comprising:
a stator extending along an axis and defining a stator interior; and
said rotor assembly as set forth in claim 1 disposed in said stator interior of said stator.

14. An electric drive unit comprising:
said electric motor as set forth in claim 13, and
a gear reduction mechanism coupled to said shaft and configured to modulate torque received from said shaft.

15. The rotor assembly as set forth in claim 1, wherein said lamination stack further includes a third lamination retainer having a third lamination retainer end and said first pole piece has a third pole retainer having a third pole retainer end disposed between said third lamination retainer end and said lamination stack such that said third lamination retainer and said third pole retainer mechanically cooperate to retain said first pole piece with respect to said lamination stack.

16. The rotor assembly as set forth in claim 15, wherein said plurality of magnets further comprise a second magnet disposed between said first pole piece and said lamination stack, and
wherein at least one of said third lamination retainer and said third pole retainer is disposed between said first magnet and said second magnet.

17. A rotor assembly for an electric motor, said rotor assembly comprising:
a shaft extending along and rotatable about an axis;
a lamination stack coupled to said shaft;
a plurality of magnets comprising a first magnet coupled to said lamination stack;
a plurality of pole pieces wherein each pole piece of said plurality of pole pieces is spaced radially outward from said shaft and separate from said lamination stack, wherein said plurality of pole pieces comprises a first pole piece, and wherein said first magnet is disposed between said lamination stack and said first pole piece; and
a plurality of spacers comprising a first spacer disposed between said first pole piece and said lamination stack to reduce flux leakage of the first magnet,
wherein said lamination stack extends along said axis between a first lamination stack end and a second lamination stack end, wherein the rotor assembly further comprises a first end cap adjacent to said first lamination stack end and a second end cap adjacent to said second lamination stack end, wherein said first end cap and said second end cap are unitary with said first spacer, wherein said lamination stack defines a plurality of channels through said lamination stack between said first lamination stack end and said second lamination stack end and separate from said plurality of spacers, wherein the rotor assembly further comprises a plurality of rods disposed in said plurality of channels, and wherein said plurality of rods are unitary with said first end cap and said second end cap;
wherein said lamination stack has a lamination retainer having a lamination retainer end and said first pole piece has a pole retainer having a pole retainer end disposed between said lamination retainer end and said lamination stack such that said lamination retainer and said pole retainer mechanically cooperate to retain said first pole piece with respect to said lamination stack;
wherein said pole retainer is further defined as a first pole retainer including a first pole hook defining a first hook recess, and said lamination retainer is further defined as a first lamination retainer including a first lamination hook extending at least partially into said first hook recess defined by said first pole hook to retain said first pole piece to said lamination stack;

wherein said first pole piece further includes a second pole retainer including a second pole hook defining a second hook recess, and said lamination stack further includes a second lamination retainer including a second lamination hook extending at least partially into said second hook recess defined by said second pole hook to retain said first pole piece to said lamination stack; and wherein said first pole hook has a first hook end and said second pole hook has a second hook end, and wherein said first hook end and said second hook end extend toward one another.

18. The rotor assembly as set forth in claim 17, wherein said lamination stack further includes a third lamination retainer having a third lamination retainer end and said first pole piece has a third pole retainer having a third pole retainer end disposed between said third lamination retainer end and said lamination stack such that said third lamination retainer and said third pole retainer mechanically cooperate to retain said first pole piece with respect to said lamination stack.

19. The rotor assembly as set forth in claim 18, wherein said plurality of magnets further comprise a second magnet disposed between said first pole piece and said lamination stack, and wherein at least one of said third lamination retainer and said third pole retainer is disposed between said first magnet and said second magnet.

\* \* \* \* \*